United States Patent [19]

Raza

[11] Patent Number: 5,745,354
[45] Date of Patent: Apr. 28, 1998

[54] PUMP CIRCUIT FOR GENERATING MULTIPLE HIGH VOLTAGE OUTPUTS FROM TWO DIFFERENT INPUTS

[75] Inventor: S. Babar Raza, Sunnyvale, Calif.

[73] Assignee: Cypress Semiconductor Corporation, San Jose, Calif.

[21] Appl. No.: 627,250

[22] Filed: Apr. 1, 1996

[51] Int. Cl.$^6$ .................................................. H02M 3/18
[52] U.S. Cl. .............................................. 363/60; 327/536
[58] Field of Search ...................... 363/59, 60; 327/536, 327/537

[56] References Cited

U.S. PATENT DOCUMENTS

| 4,839,787 | 6/1989 | Kojima et al. | 363/60 |
|---|---|---|---|
| 4,922,402 | 5/1990 | Olivo et al. | 363/60 |
| 4,962,512 | 10/1990 | Kiuchi | 377/78 |
| 4,970,409 | 11/1990 | Wada et al. | 307/296.1 |
| 5,059,815 | 10/1991 | Bill et al. | 307/246 |
| 5,339,236 | 8/1994 | Tamagawa | 363/59 |
| 5,483,486 | 1/1996 | Javanifard et al. | 327/536 |
| 5,535,160 | 7/1996 | Yamaguchi | 327/536 |
| 5,543,668 | 8/1996 | Fong | 363/60 |
| 5,574,634 | 11/1996 | Parlour et al. | 363/59 |

OTHER PUBLICATIONS

S. Babar Raza, U.S.S.N. 08/597,849, A Single Pump for Generating High Voltage from Two Different Inputs, filed Feb. 7, 1996.

Primary Examiner—Stuart N. Hecker
Attorney, Agent, or Firm—Bliss McGlynn, P.C.

[57] ABSTRACT

The present invention provides a pump circuit for generating a single variable high voltage output or multiple high voltage outputs that respond to one or more discrete inputs. The present invention utilizes a common pump circuitry to process the discrete voltage inputs. Each of the discrete voltage inputs can be a different input voltage and can be stepped up to a higher output voltage according to the design constraints of the pump circuitry. Since the pump circuitry is used for each of the inputs, the amount of chip real estate consumed is minimized to avoid redundancy. A switching system is implemented that detects which input has a voltage present and activates a particular path to the pump output accordingly.

25 Claims, 5 Drawing Sheets

PUMP CIRCUIT FOR GENERATING MULTIPLE HIGH VOLTAGE OUTPUTS FROM TWO DIFFERENT INPUTS

FIELD OF THE INVENTION

The present invention relates to high voltage pump circuits generally and, more particularly, to a pump circuit for generating a number of variable high voltage outputs from one or more discrete inputs.

BACKGROUND OF THE INVENTION

An electrically programmable ROM (EPROM) implements non-volatile storage of data by using a storage transistor that has a so-called floating gate. The storage transistor, or memory cell, is programmed by having hot electrons injected into a floating gate to cause a substantial shift in the threshold voltage of the storage transistor. This technique is generally termed hot electron tunneling. Under high gate and high drain voltages, electrons gain sufficient energy to jump the silicon-silicon dioxide energy barrier, penetrating the oxide and flowing to the floating gate, which is completely surrounded by oxide.

To implement the hot electron tunneling during the programming process, a voltage higher than the input voltage is generally required. To generate the high voltage necessary to realize the high current path, a pump circuit is generally implemented.

Another programming technique, FN tunneling, utilizes a quantum-mechanical effect which allows electrons to pass through the energy barrier at the silicon-silicon dioxide interface. While the energy required for the electrons to pass through this barrier is generally much lower than the energy required for hot electron injection programming, a pump circuit is still required.

A pump can generate a high voltage pump output from a single input. Generally, if more than one input or output is required to produce high voltage pump outputs, separate pump circuits are required. The implementation of separate pump circuits generally require more chip real estate than the implementation of a single pump circuit. This is undesirable when the goal of efficient use of device area particularly in the very large scale integration (VLSI) technology is to be achieved. A discussion of previous approaches to implement a multiple input/single output high voltage pump circuit is discussed in a copending application Ser. No. 08/597,849, incorporated herein by reference in its entirety.

SUMMARY OF THE INVENTION

The present invention provides a pump circuit for generating a single variable high voltage output or multiple high voltage outputs that respond to one or more discrete inputs. The present invention uses a common pump circuitry to process the discrete voltage inputs. Each of the discrete voltage inputs can be a different input voltage and can be stepped up to a higher output voltage according to the design constraints of the pump circuitry. Since the pump circuitry is used for each of the inputs, the amount of chip real estate consumed can be minimized to avoid redundancy. For example, a switching system may be implemented to detect which input has a voltage present and to activate a particular path to the pump output accordingly.

The objects, features and advantages of the present invention include providing a pump circuit for producing one or more variable high voltage outputs in response to a number of discrete voltage inputs. The pump circuit can minimize the amount of redundant circuitry present and automatically select between the various pump inputs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
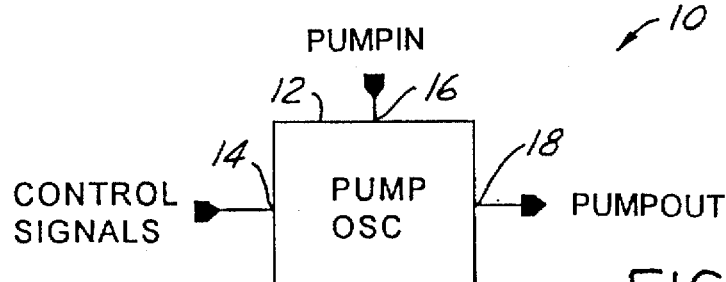
FIG. 1 is a block diagram of a pump circuit according to a preferred embodiment of the present invention illustrating a single input and a single multiple level pump output.

FIG. 1 is a block diagram showing a pump circuit 10 in accordance with a preferred embodiment of the present invention. The pump circuit 10 comprises a pump oscillator 12 that receives an input 14, an input 16 and provides an output 18. The input 14 receives control signals that are used to control a high voltage output Pumpout presented at the output 18. The input 16 receives a signal Pumpin. The output Pumpout can have a magnitude comprising any number of voltages to fit the design criteria of a particular application. For example, if five different voltage outputs were needed at the Pumpout, the number of control signals could be increased to five.

Figure 2:
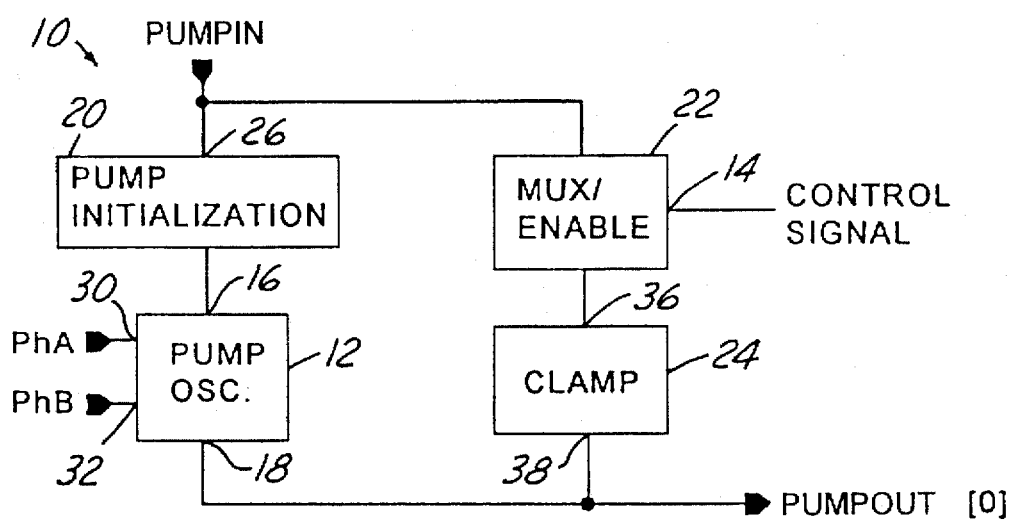
FIG. 2 is a more detailed block diagram of the pump circuit.

Referring now to FIG. 2, a more detailed block diagram of the pump circuit 10 is shown. The pump circuit 10 further comprises a pump initialization circuit 20, a multiplexer and enable circuit 22 and a clamp circuit 24. The pump oscillator 12 receives the input 16 from the pump initialization circuit 20. The pump initialization circuit 20 has an input 26 that receives the signal Pumpin. The pump oscillator 12 has an input 30 that receives a first phase oscillator input PhA and an input 32 that receives a second phase oscillator input PhB. The clamp circuit 24 has an input 36 that receives a signal from the multiplexer and enable circuit 22. The clamp circuit 24 provides an output 38 that works in combination with the output 18 to produce the output Pumpout.

A single oscillator input could be used in place of the input 30 and the input 32. However, it is generally recognized that a dual oscillator input configuration provides improved performance. The multiplexer and enable circuit 14, in combination with the control signal received at the input 14, presents a plurality of pump voltages to the input 36. The clamp circuit 24 provides a clamping effect to limit the highest voltage presented at the output 38.

Figure 3:
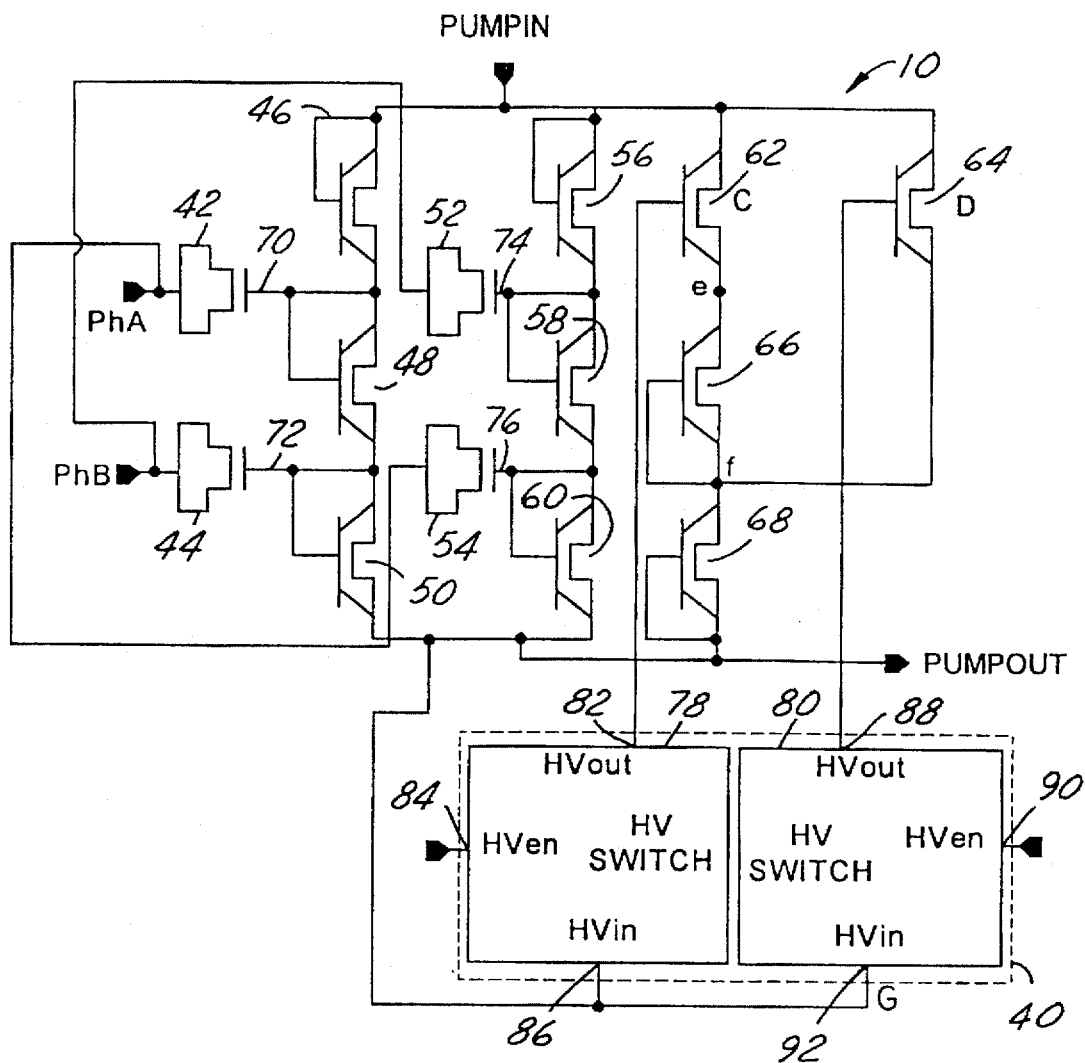
FIG. 3 is a circuit diagram of the pump circuit illustrating a single input and a single multi-level output.

Referring to FIG. 3, the pump circuit 10 is shown in greater detail. The circuit 10 generally comprises the input Pumpin, the first phase oscillator input PhA, the second phase oscillator input PhB, the output Pumpout, and an HV switch block 40. The pump circuit 10 further comprises a capacitively coupled transistor 42, a capacitively coupled transistor 44, a transistor 46, a transistor 48, a transistor 50, a capacitively coupled transistor 52, a capacitively coupled transistor 54, a transistor 56, a transistor 58, a transistor 60, a C transistor 62, a D transistor 64, a transistor 66 and a transistor 68.

The transistor 42 receives the first phase oscillator input PhA and presents an output 70 to both the gate and the drain of the transistor 48 as well as to the source of the transistor 46. The sources and drains of the transistors 46, 48 and 50 are cascaded together. The capacitively coupled transistor 44 receives the second phase oscillator input PhB and presents an output 72 to both the gate and the drain of the transistor 50 as well as to the source of the transistor 48. The second phase oscillator input PhB is also presented to the capacitively coupled transistor 52. Similarly, the first phase oscillator input PhA is also presented to the capacitively coupled transistor 54.

The drains and sources of the transistors 56, 58 and 60 are cascaded together. The capacitively coupled transistor 52 has an output 74 that is presented to both the gate and the drain of the transistor 58 as well as to the source of the transistor 56. The capacitively coupled transistor 54 has an output 76 that is presented to both the gate and the drain of the transistor 60 as well as to the source of the transistor 58. The drain of the transistor 46, the transistor 56, the transistor 62 and the transistor 64 each receives the input Pumpin. The sources of the transistor 50, the transistor 60 and the transistor 68 are coupled together and are presented to both the output Pumpout and to the HV switch block 40.

The HV switch block 40 comprises a high voltage switch 78 and a high voltage switch 80. The high voltage switch 78 has an output 82 that is coupled to the gate of the C transistor 62, an input 84 that receives a control signal and an input 86 that receives a signal from the output Pumpout. The high voltage switch 80 has an output 88 that is coupled to the gate of the D transistor 64. The high voltage switch 80 also has an input 90 that receives a control signal and an input 92 that receives a signal G from the output Pumpout.

The transistors 64 and 66 provide a clamping path for the output Pumpout. The clamping path for the output Pumpout is controlled by the C transistor 62 and the D transistor 64, which make up the multiplexer and enable circuit 17 of FIG. 2. The output Pumpout can be a voltage at either a first level equal to Vpp+2Vin or at a second level equal to Vpp+Vtn. The output Pumpout is at the first level when the high voltage switch 78 receives the control signal at the input 84. This causes the output 82 of the high voltage switch 78 to turn on the C transistor 62 which enables the voltage path through the transistors 66 and 68.

When the high voltage switch 80 receives the control signal at the input 90, the output Pumpout is at the second level. The high voltage switch 80 presents a signal at the output 88 that is received at the gate of the D transistor 64. The D transistor turns on a voltage path through the transistor 68. In the first level (i.e., Vpp+2Vtn), is equal to Vpp plus two times the threshold voltage (i.e., the threshold voltage across the transistor 66 and the transistor 68). The second level (i.e., Vpp+Vtn) is equal to Vpp plus the threshold voltage across the transistor 68. If additional voltage is required at the output Pumpout, the transistor 68 can be replaced with any number of transistors to create the desired threshold voltage. The C transistor 62 turns on the clamping voltage at the node e, while the D transistor turns on the clamping voltage at the node f. The number of transistors between the node e and the node f can be of any number necessary to meet the design criteria of a particular application. Similarly, the number of transistors between the node f and the output Pumpout can be of any number of transistors needed to meet the design criteria of a particular application.

The majority of the components of the circuit 10 are used for processing the input Pumpin. Since the capacitively coupled transistors 42, 44, 52 and 54 are not duplicated, the circuit 10 generally reduces the chip real estate. The support transistors take up much less chip real estate than the capacitively coupled transistors. Therefore, efficient use of chip real estate is realized. If more than two inputs are required to produce additional levels at the Pumpout, additional HV switches 78 and 80 may be implemented. The number of HV switches 78 and 80 may be equal to the number of discrete voltage outputs derived from the circuit 10.

Figure 4:
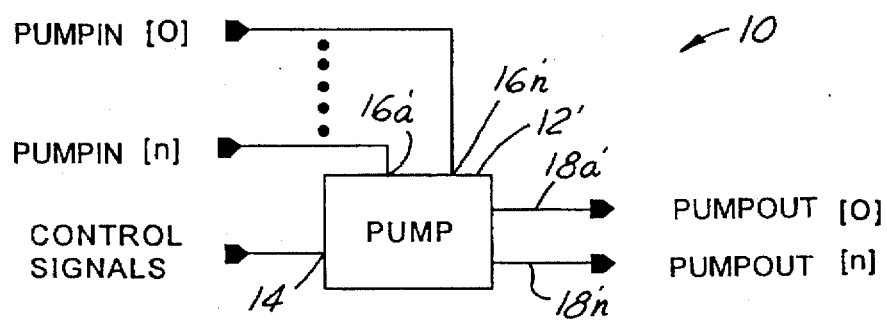
FIG. 4 is a block diagram of a first alternate embodiment of the present invention illustrating a pump circuit having multiple inputs and multiple outputs.

Referring to FIG. 4, a pump circuit 10' is shown in accordance with a first alternate embodiment of the present invention. The pump circuit 10' generally comprises similar components as the pump circuit 10 and the components are indicated with primed reference numerals. The pump 10' comprises a number of inputs Pumpin [0~n] as well as a number of outputs Pumpout [0~n]. The pump circuit 10' allows multiple devices to be powered by a single pump oscillator 12'.

Figure 5:
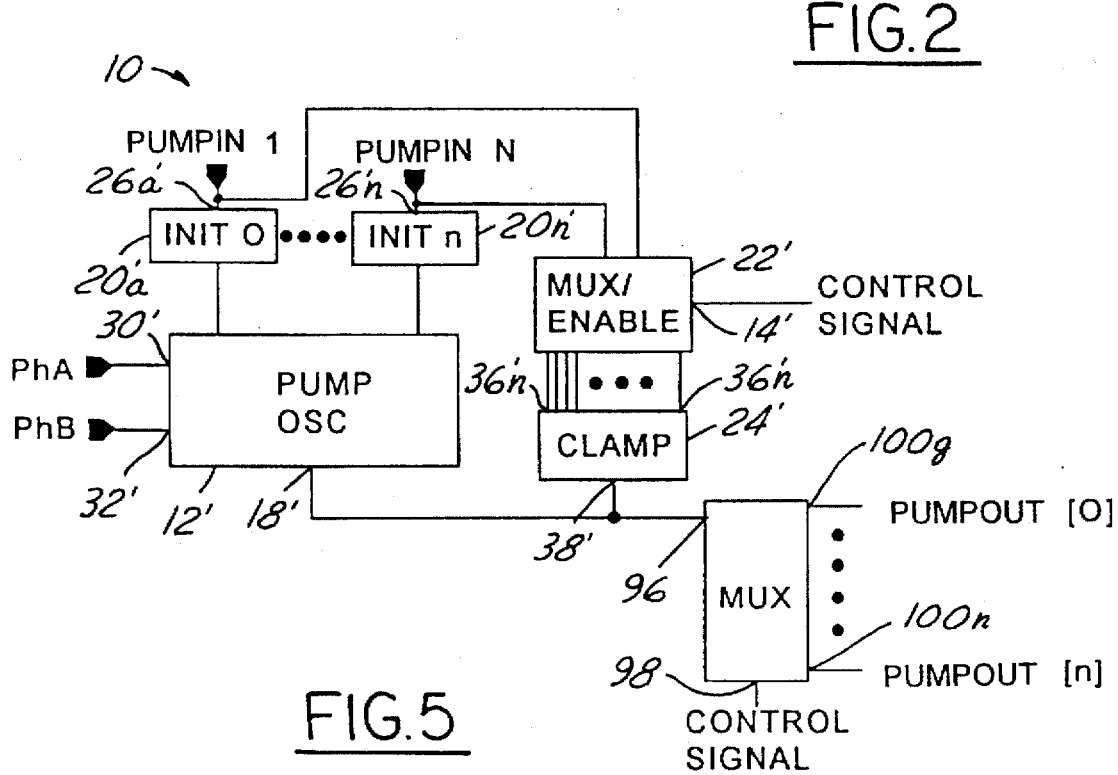
FIG. 5 is a more detailed block diagram of the first alternate embodiment illustrating a pump circuit having multiple inputs and multiple outputs.

Referring to FIG. 5, a more detailed block diagram of the pump circuit 10' is shown. The pump circuit 10' is similar to the pump circuit 10 illustrated in FIG. 2 wherein similar components are labeled with the primed reference numerals. The pump circuit 10' further comprises a number of pump initialization circuits 20a'~20n'. Each of the pump initialization circuits 20a'~20n' has an input 26a'~26n' that receives an input Pumpin[1~n]. The inputs Pumpin[1~n] are also presented to the multiplexer and enable block 22'. The multiplexer and enable block 22' presents signals to the inputs 36a'~36n' of the clamp circuit 24'.

The pump circuit 10' further comprises a multiplexer 94 having an input 96 that receives a signal from both the output 18' and the output 38'. The multiplexer 94 also has an input 98 that receives a control signal. The multiplexer 94 has a number of outputs 100a~100n that represent the outputs Pumpout[0~n]. The multiplexer 94 allows a number of individual outputs Pumpout[0~n] to be distributed to meet the design requirements of a particular application.

Figure 6:
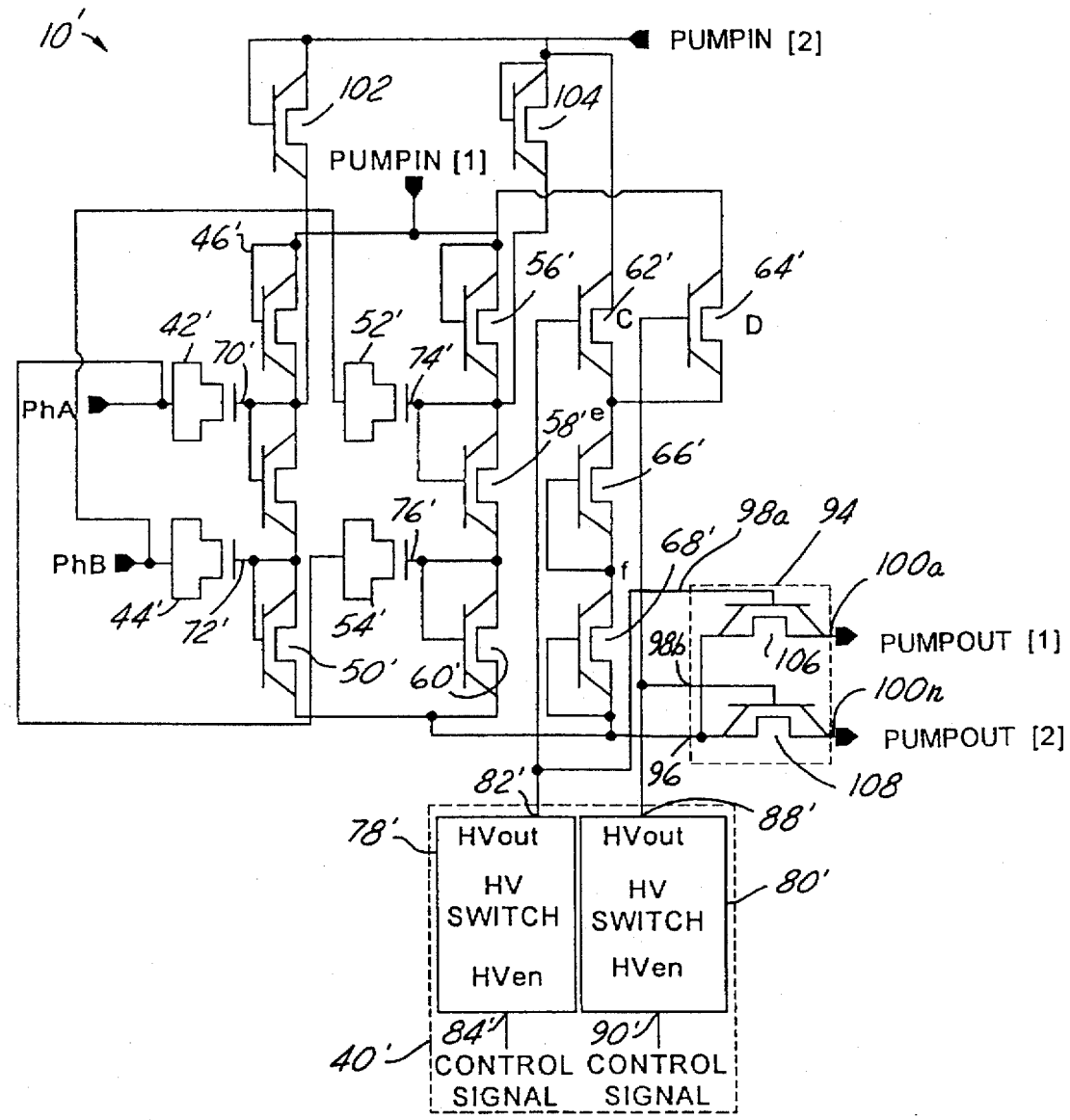
FIG. 6 is a circuit diagram of the first alternate embodiment illustrating a pump circuit having multiple inputs and multiple outputs.

Referring now to FIG. 6, one embodiment of the pump circuit 10' having two inputs and two outputs is shown in greater detail. The pump circuit 10' additionally comprises a transistor 102 and a transistor 104. The transistor 102 has a gate and a source which receive the input Pumpin[2] as well as a drain which is coupled to the output 70' of the capacitively coupled transistor 42'. Both the gate and the drain of the transistor 104 are coupled to the input Pumpin[2] as well as to the source of the transistor 62'. The source of the transistor 104 is coupled to the output 74' of the capacitively coupled transistor 52'.

The multiplexer 94 additionally comprises a transistor 106 and a transistor 108. The source of the transistor 106 and the source of the transistor 108 are coupled to the input 96.

The drain of the transistor 106 has an output 100a that represents the output Pumpout[1]. The drain of the transistor 108 has an output 100n that represents the output Pumpout [2]. The gate of the transistor 106 receives a signal at the control input 98a that is coupled to the output 82' of the high voltage switch 78'. Similarly, the gate of the transistor 108 is coupled to the control input 98b that receives a signal from the output 88' of the high voltage switch 80'.

When the high voltage switch 78' receives the control signal at the input 84', a signal is presented at the output 82' that is received at both the gate of the C transistor 62' as well as at an input 98a of the multiplexer 94. When the C transistors 62' is turned on, the input Pumpin[1] is presented to the input 96 of the multiplexer 94.

When the high voltage switch 80' receives the control signal at the input 90', a signal is presented at the output 88' that is received at both the gate of the D transistor 64' as well as at an input 98b of the multiplexer 94. When the D transistors 64' is turned on, the input Pumpin[1] is presented to the input 96 of the multiplexer 94. Additionally, the input 98b of the multiplexer 94 turns on the transistors 108 and presents the output Pumpout[2] at the output 100n.

Figure 7:
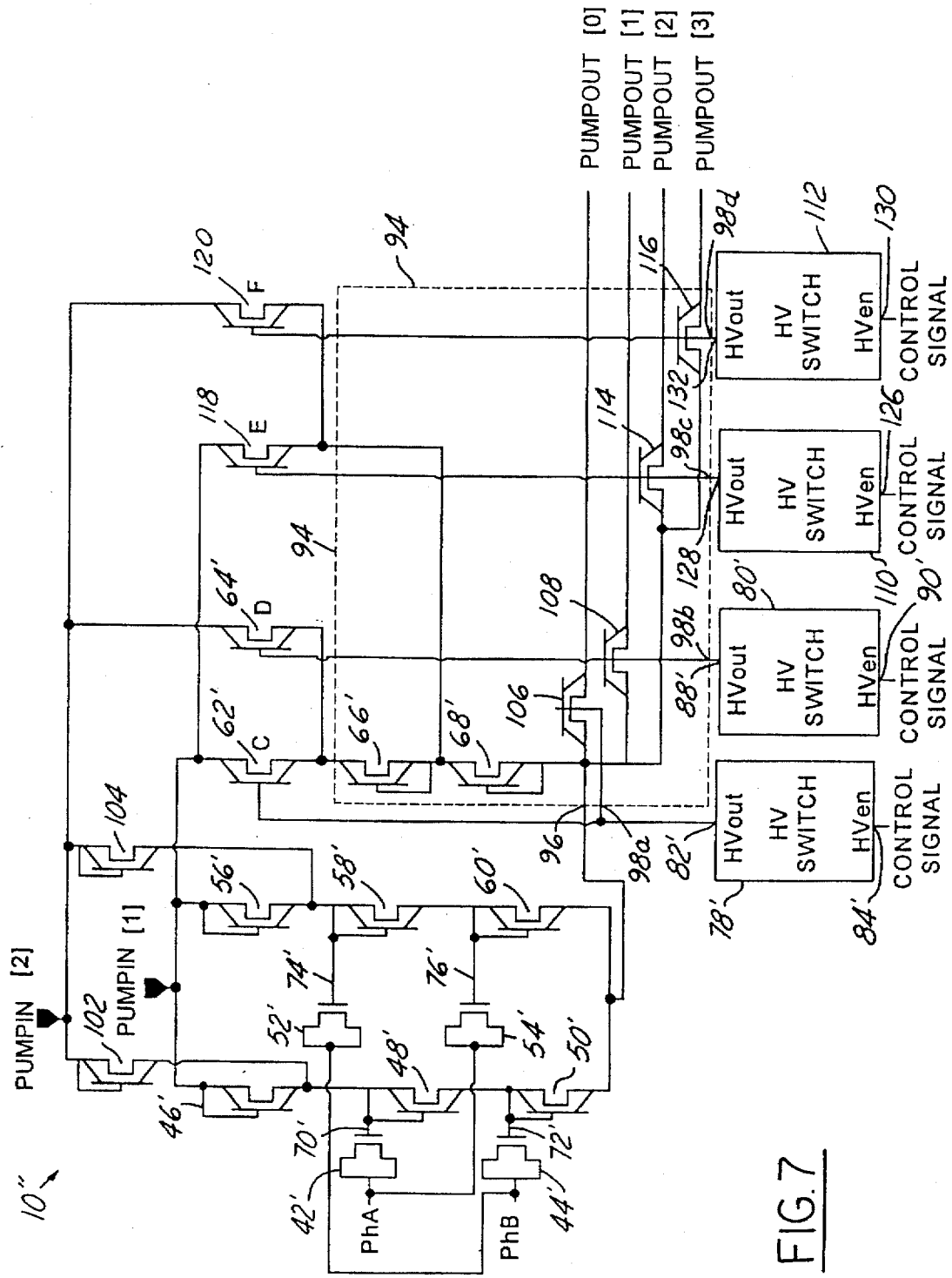
FIG. 7 is a second alternate embodiment illustrating a pump circuit having multiple inputs and multiple outputs.

Referring to FIG. 7, a second alternate embodiment of the pump circuit 10" is shown comprising additional high voltage switches 110 and 112, transistors 114, 116, 118 and 120, inputs 98c and 98d and outputs Pumpout[2] and Pumpout [3]. Additionally, an E transistor 118 and an F transistor 120 are provided. The high voltage switch 110 receives a control signal at an input 126 and provides an output 128. The high voltage switch 112 receives a control signal at an input 130 and provides an output 132. The high voltage switches 110 and 112 perform similar functions to the high voltage switches 78' and 80' to provide the additional outputs Pumpout[2] and Pumpout[3].

The high voltage switch 78' presents a signal at the output 82' that is received at the gate of the C transistor 62' and the gate of the transistor 106. When the signal is present at the output 82, the output Pumpout[0] is activated at a voltage level equal to Pumpin[1]+2Vtn, where Vtn is the threshold voltage of one of the transistors. The high voltage switch 80' presents a signal at the output 88' that is received at the gate of the D transistor 64' as well as at the gate of the transistor 108. When the signal is presented at the output 88', the output Pumpout[1] is activated at a voltage equal to Pumpin [2]+2Vtn. The high voltage switch 110 presents a signal at an output 128 that is received at the gate of the E transistor 118 as well as at a gate of the transistor 114. When the signal is presented at the output 128, the output Pumpout[2] is activated at a voltage equal to the input Pumpin[1]+Vtn. Similarly, the high voltage switch 112 presents a signal at the output 132 that is received at the gate of the F transistor 120 as well as at a gate of the transistor 116. When the signal is presented at the output 132, the output Pumpout[3] is activated at a voltage equal to the input Pumpin[2]+Vtn.

Figure 8:
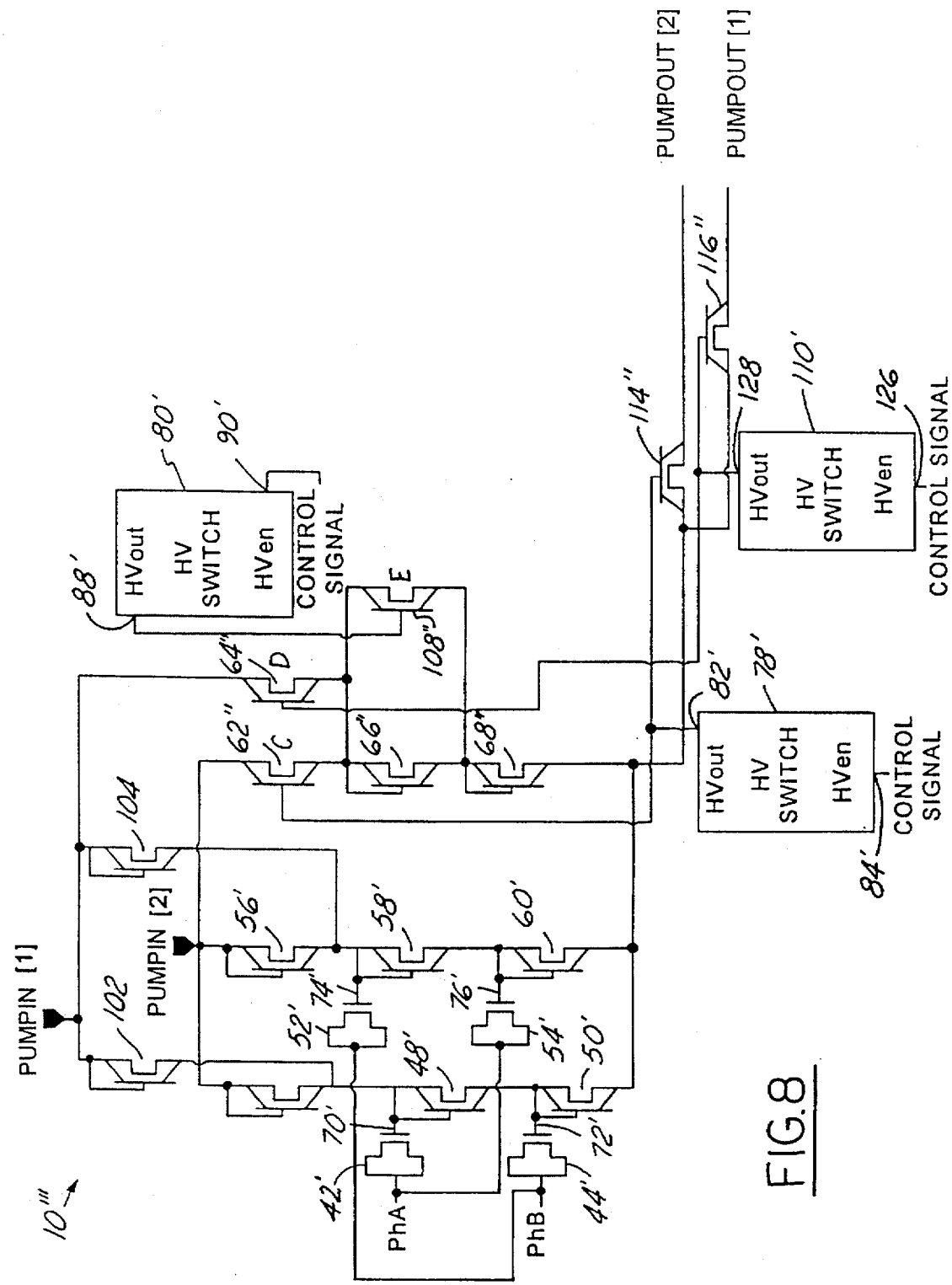
FIG. 8 is a third alternate embodiment illustrating a pump circuit having multiple inputs and multiple multi-level outputs.

Referring to FIG. 8, a third alternate embodiment of the pump circuit 10'" is shown comprising an alternate configuration of the multiplexer 94. The third alternate embodiment pump circuit 10'" comprises an output Pumpout[1] and an output Pumpout[2]. When only the C transistor 62" is on, the output Pumpout[2] is equal to the input Pumpin[2]+2Vtn. When the C transistor 62" and the E transistor 108" are both on, the output Pumpout[2] is equal to the input Pumpin[2] +Vtn. When the D transistor 64" and the transistor 116" are each on the output Pumpout[1] is equal to the input Pumpin [1]+2Vtn. When the D transistor 64", the E transistor 108" and the transistor 116" are on, the output Pumpout[1] is equal to the input Pumpin[1]+Vtn. Additional combinations of turning on the transistors 62", 64", 106", 108", 114" and 116" may be used to create other combinations at the outputs Pumpout[1] and Pumpout[2]. For example, the input Pumpin[1] may be presented at the Pumpout[2].

While the invention has been particularly shown and described with reference to a preferred embodiment and three alternate embodiments thereof, it will be understood by those skilled in the art that various changes in form and details may be made without departing from the spirit and scope of the invention.

I claim:

1. A circuit comprising:
   (a) a plurality of voltage inputs, each having a voltage level;
   (b) a pump configured to: (i) receive said plurality of voltage inputs, (ii) increase each of said voltage levels and (iii) provide a plurality of outputs having different voltage levels; and
   (c) a selector configured to (i) receive a control signal and (ii) select one of said outputs in response to said control signal.

2. The circuit according to claim 1 wherein said pump comprises:
   at least one capacitive device configured to receive signals from at least one phase oscillator.

3. The circuit according to claim 2 wherein said pump comprises at least two capacitive devices configured to receive at least two phase oscillator signals.

4. The circuit according to claim 1 wherein each of said outputs has one or more voltage levels.

5. A circuit for providing multiple pump outputs from a plurality of voltage inputs, said circuit comprising:
   voltage increasing means for receiving said plurality of voltage inputs and for increasing the voltage of said voltage inputs by one of a plurality of predetermined voltages to provide said pump outputs; and
   means for selecting said one of said plurality of predetermined voltages.

6. The circuit according to claim 5 further comprising a plurality of pump outputs.

7. The circuit according to claim 5 wherein each of said predetermined voltages has an independent magnitude of voltage increase.

8. The circuit according to claim 5 wherein said voltage increasing means comprises:
   capacitive means for receiving signals from at least one phase oscillator.

9. The circuit according to claim 8 wherein said capacitive means comprises a plurality of phase oscillator inputs.

10. The circuit according to claim 5 further comprising:
    switching means for providing one or more switching outputs in response to one or more enable inputs, said switching outputs for enabling one of said predetermined voltages.

11. The circuit according to claim 10 wherein said pump comprises a plurality of paths, each of said paths comprising a different number of diodes and said magnitude of said voltage increase is determined by said switching means, wherein said switching means selects from said plurality of paths.

12. The circuit according to claim 11 further comprising a plurality of inputs.

13. The circuit according to claim 11 wherein said diodes comprise transistors having either: i) a drain coupled to a gate or (ii) a source coupled to said gate.

14. The circuit according to claim 11 wherein at least one of said plurality of paths comprises a clamping path comprising one or more transistors, wherein said clamping path limits said voltage present at said output to a predetermined clamping voltage.

15. The circuit according to claim 14 wherein a magnitude of said predetermined clamping voltage is determined by the number of transistors in said clamping path.

16. The circuit according to claim 5 wherein said voltage increasing means comprises at least two capacitive means for increasing the voltage of said inputs, each of said capacitive means receiving at least one phase oscillator signal.

17. The circuit according to claim 5 further comprising: switching means for receiving one or more enable inputs and providing one or more switching outputs, said switching outputs for enabling one of said voltage inputs and one of said pump outputs.

18. The circuit according to claim 5 wherein each of said outputs comprises a multi-level high voltage pump output.

19. The circuit according to claim 5 wherein said voltage increasing means comprises capacitive means for receiving a plurality of phase oscillator inputs.

20. The circuit according to claim 19 wherein said voltage increasing means comprises a plurality of paths, each of said paths comprising a different number of diodes and each of said different voltage levels is determined by said selector means, wherein said selector means selects from said plurality of paths.

21. The circuit according to claim 20 wherein said diodes comprise transistors having either: (i) a drain coupled to a gate or (ii) a source coupled to said gate.

22. The circuit according to claim 21 wherein at least one of said plurality of paths comprises a clamping path comprising one or more transistors, wherein said clamping path limits said voltage present at said outputs to a predetermined clamping voltage.

23. The circuit according to claim 22 wherein a magnitude of said predetermined clamping voltage is determined by the number of transistors in said clamping path.

24. A method for providing a plurality of pump outputs from one or more voltage inputs comprising the steps of:

(a) receiving a plurality of voltage inputs each having an initial voltage level;

(b) increasing the initial voltage level of one of said plurality of voltage inputs by a plurality of predetermined voltages, thus providing a plurality of pump outputs having different voltages; and (c) selecting from said plurality of pump outputs.

25. The method according to claim 24 wherein said one or more pump outputs comprises a multi-level pump output.

* * * * *